United States Patent
Kray et al.

(10) Patent No.: US 10,697,470 B2
(45) Date of Patent: Jun. 30, 2020

(54) CONTAINMENT CASE TRENCH FILLER LAYER AND METHOD OF CONTAINING RELEASABLE COMPONENTS FROM ROTATABLE MACHINES

(71) Applicant: General Electric Company, Schenectady, NY (US)

(72) Inventors: Nicholas Joseph Kray, Mason, OH (US); Douglas Duane Ward, West Chester, KY (US)

(73) Assignee: General Electric Company, Schenectady, NY (US)

( * ) Notice: Subject to any disclaimer, the term of this patent is extended or adjusted under 35 U.S.C. 154(b) by 518 days.

(21) Appl. No.: 15/043,881

(22) Filed: Feb. 15, 2016

(65) Prior Publication Data

US 2017/0234329 A1    Aug. 17, 2017

(51) Int. Cl.
*F04D 29/52* (2006.01)
*F01D 21/04* (2006.01)
(Continued)

(52) U.S. Cl.
CPC ......... *F04D 29/526* (2013.01); *F01D 21/045* (2013.01); *F04D 29/023* (2013.01);
(Continued)

(58) Field of Classification Search
CPC . F04D 29/526; F01D 21/045; F05D 2250/283
See application file for complete search history.

(56) References Cited

U.S. PATENT DOCUMENTS 5,160,248 A    11/1992  Clarke
5,336,044 A    8/1994   Forrester
(Continued)

FOREIGN PATENT DOCUMENTS

| CN | 101063456 A | 10/2007 |
|----|-------------|---------|
| EP | 2 940 251 A1 | 11/2015 |
| GB | 2 407 344 A | 4/2005 |

OTHER PUBLICATIONS

Extended European Search Report and Opinion issued in connection with corresponding EP Application No. 17156139.2 dated Jul. 14, 2017.
(Continued)

*Primary Examiner* — Kevin F Murphy
(74) *Attorney, Agent, or Firm* — Dority & Manning, P.A.

(57) ABSTRACT

A containment case includes a fan assembly including a hub having a plurality of fan blades extending radially outward between radially inward blade roots and radially outward blade tips. Containment case includes a radially outer shell circumscribing fan assembly and having a first radially inner surface and a radially outer surface, an inner structure having a second radially inner surface extending along first radially inner surface, and a trench extending circumferentially along second radially inner surface into inner structure from second radially inner surface. The trench is approximately axially aligned with the fan assembly. The containment case also includes, within the trench, a trench filler layer configured to dissipate impact energy from a released fan blade and having a plurality of sheets including a fibrous composite material having a plurality of fibers fabricated within each sheet, where the sheets are coupled together into a repeating pattern of hollow units.

16 Claims, 6 Drawing Sheets

(51) Int. Cl.
  *F04D 29/02* (2006.01)
  *F04D 29/32* (2006.01)
  *F04D 29/64* (2006.01)
  *F04D 29/66* (2006.01)

(52) U.S. Cl.
  CPC ......... *F04D 29/325* (2013.01); *F04D 29/644* (2013.01); *F04D 29/664* (2013.01); *F05D 2220/36* (2013.01); *F05D 2230/60* (2013.01); *F05D 2260/311* (2013.01); *Y02T 50/672* (2013.01)

(56) References Cited

U.S. PATENT DOCUMENTS

| | | |
|---|---|---|
| 5,498,462 A | 3/1996 | Darfler |
| 6,245,407 B1 | 6/2001 | Wang et al. |
| 6,698,484 B1 | 3/2004 | Corbett et al. |
| 7,246,990 B2 | 7/2007 | Xie et al. |
| 8,157,212 B2 | 4/2012 | Biornstad et al. |
| 8,671,693 B2 | 3/2014 | Straza |
| 8,777,161 B2 | 7/2014 | Pollock et al. |
| 9,708,930 B2* | 7/2017 | Koroly ............ F01D 25/04 |
| 2006/0093847 A1 | 5/2006 | Hornick et al. |
| 2009/0087309 A1* | 4/2009 | Schreiber ......... F01D 21/045 |
| | | 415/200 |
| 2014/0255152 A1* | 9/2014 | Totten ............. F01D 25/24 |
| | | 415/9 |
| 2014/0329043 A1* | 11/2014 | Shigetomi ........ F02C 7/045 |
| | | 428/63 |
| 2015/0190981 A1 | 7/2015 | Levit et al. |

OTHER PUBLICATIONS

Machine Translation and First Office Action and Search issued in connection with corresponding CN Application No. 201710082513.5 dated Aug. 29, 2018.

Chinese Office Action Corresponding to 2017100825135 dated May 7, 2019.

* cited by examiner

CONTAINMENT CASE TRENCH FILLER LAYER AND METHOD OF CONTAINING RELEASABLE COMPONENTS FROM ROTATABLE MACHINES

BACKGROUND

The field of the disclosure relates generally to devices and methods for containing potentially releasable components from rotatable machines and, more particularly, a containment case for a gas turbine engine fan assembly configured to dissipate impact energy from a released fan blade.

At least some known rotatable machines such as gas turbine engines include rotating components mounted to shafts and surrounded by shrouds and casings that provide structural support and air flow guidance through the machine. The rotating components, including the blades of fans, compressors, and turbines, for example, rotate with a tip of the respective component passing very close to the shrouds or casings. During some events, for example, a bird ingestion into the gas turbine engine, the blades may contact the shrouds or casings. Also, during at least some such events, the blades may be released from gas turbine engines, i.e., "fan blade out" (FBO), and pose a threat to operators and bystanders as projectiles. Such events also typically cause damage to the shrouds or casings of the blades and to other components of gas turbine engines. The damage may also cause the gas turbine engine to operate with a lesser capability, necessitating repair.

To facilitate mitigating such damage and possibly forestalling immediate repair necessity, some shrouds or casings are equipped with abradable material that circumscribe at least some of the rotating components, such as, the fan blades. The abradable material serves to form a portion of the flow path of the fan assembly. However, during an event where the blade is released and contacts the abradable material of the fan casing, the abradable material at least partially yields, dissipating projectile energy of the released blade and minimizing damage to the gas turbine engine. The abradable material is designed to be relatively easy to replace or repair such that total maintenance time to repair the casing after an event, e.g., an FBO, is minimized. However, at least some known abradable materials are constructed of paper and, thus, are not easily tailored in terms of physical characteristics including sheer stiffness. Such known abradable materials require increased weight and space to achieve increased sheer stiffness for effective energy dissipation upon impact of released components in rotatable machines such as gas turbine engines.

BRIEF DESCRIPTION

In one aspect, a containment case for a fan assembly is provided. The fan assembly includes a hub having a plurality of fan blades extending radially outward between radially inward blade roots and radially outward blade tips. The containment case includes a radially outer shell circumscribing the fan assembly and including a first radially inner surface and a radially outer surface. The containment case also includes an inner structure including a second radially inner surface extending along the first radially inner surface. The containment case further includes a trench extending circumferentially along the second radially inner surface and into the inner structure from the second radially inner surface, the trench approximately axially aligned with the fan assembly. The containment case also includes a trench filler layer positioned within the trench, the trench filler layer configured to dissipate an amount of impact energy from a released fan blade and including a plurality of sheets. Each sheet of the plurality of sheets includes a fibrous composite material having a plurality of fibers fabricated within each sheet of the plurality of sheets, where the plurality of sheets are coupled together into a repeating pattern of hollow units.

In another aspect, a gas turbine engine is provided. The gas turbine engine includes a fan assembly including a hub having a plurality of fan blades extending radially outward between radially inward blade roots and radially outward blade tips. The gas turbine engine also includes a containment case. The containment case includes a radially outer shell circumscribing the fan assembly and including a first radially inner surface and a radially outer surface. The containment case also includes an inner structure including a second radially inner surface extending along the first radially inner surface. The containment case further includes a trench extending circumferentially along the second radially inner surface and into the inner structure from the second radially inner surface, the trench approximately axially aligned with the fan assembly. The containment case also includes a trench filler layer positioned within the trench, the trench filler layer configured to dissipate an amount of impact energy from a released fan blade and including a plurality of sheets. Each sheet of the plurality of sheets includes a fibrous composite material having a plurality of fibers fabricated within each sheet of the plurality of sheets, where the plurality of sheets are coupled together into a repeating pattern of hollow units.

In yet another aspect, a method of containing a potentially releasable component from a rotor of a rotatable machine is provided. The rotatable machine includes a containment case extending circumferentially about the potentially releasable component. The containment case includes a trench having a trench filler layer extending circumferentially along a radially inward surface of the containment case. The method includes determining an amount of energy contained in the potentially releasable component upon impacting the containment case. The method also includes determining at least one physical characteristic of the trench filler layer to facilitate dissipation therein of the amount of energy. The method further includes forming the trench filler layer having the at least one physical characteristic via a plurality of sheets, each sheet of the plurality of sheets including a fibrous composite material having a plurality of fibers fabricated within each sheet of the plurality of sheets, where the plurality of sheets are coupled together into a repeating pattern of hollow units. The method also includes positioning the trench filler layer within the trench proximate the potentially releasable component.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIGS. 1-5 show example embodiments of the apparatus, systems, and methods described herein.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, and such ranges are identified and include all the sub-ranges contained therein unless context or language indicates otherwise.

The following detailed description illustrates embodiments of the disclosure by way of example and not by way of limitation. It is contemplated that the disclosure has general application to systems and methods for containing potentially releasable components from rotatable machines using containment cases having trench filler layers configured to dissipate impact energy from released components.

Embodiments of the containment case trench filler layer apparatus and methods described herein mitigate the threat to operators and bystanders from released components of rotatable machines such as gas turbine engines. The containment case trench filler layer apparatus and methods described herein also mitigate damage to, and repair extensiveness for, rotatable machines such as gas turbine engines resulting from released components thereof. Further, the containment case trench filler layer apparatus and methods described herein mitigate negative effects of released components on the operational performance of rotatable machines such as gas turbine engines. Furthermore, the containment case trench filler layer apparatus and methods described herein provide effective energy dissipation upon impact of released components in rotatable machines such as gas turbine engines. Moreover, the containment case trench filler layer apparatus and methods described herein enable tailoring physical characteristics such as sheer stiffness to particular operational requirements of rotatable machines such as gas turbine engines without increasing weight and space of trench filler layers.

Figure 1:
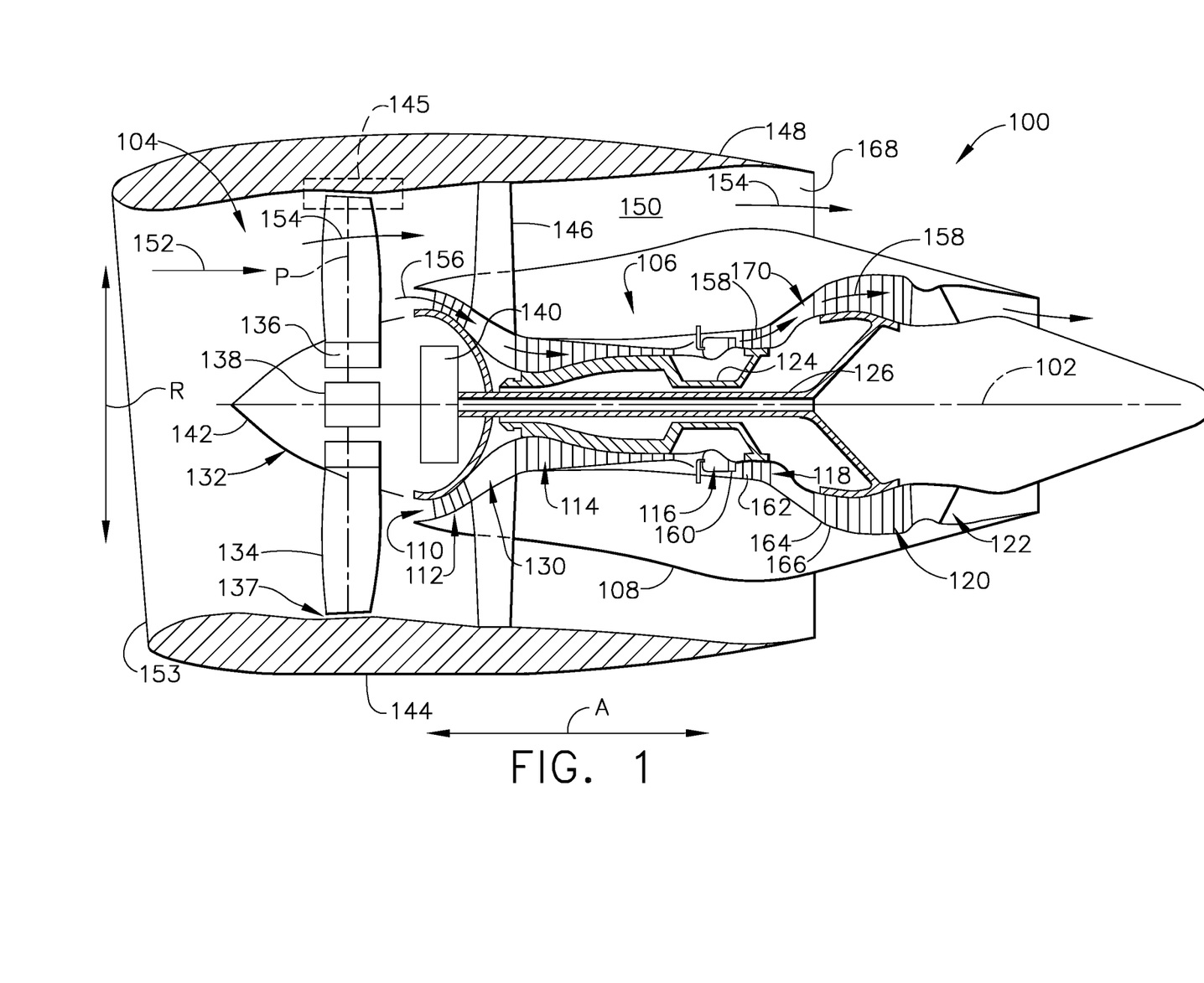
FIG. 1 is a schematic cross-sectional view of an example embodiment of a gas turbine engine.

FIG. 1 is a schematic cross-sectional view of an example embodiment of a gas turbine engine 100. In the example embodiment, gas turbine engine 100 is embodied in a high-bypass turbofan jet engine. As shown in FIG. 1, gas turbine engine 100 defines an axial direction A (extending parallel to a longitudinal axis 102 provided for reference) and a radial direction R. In general, gas turbine engine 100 includes a fan assembly 104 and a core turbine engine 106 disposed downstream from fan assembly 104.

In the example embodiment, core turbine engine 106 includes an approximately tubular outer casing 108 that defines an annular inlet 110. Outer casing 108 encases, in serial flow relationship, a compressor section including a booster or low pressure (LP) compressor 112 and a high pressure (HP) compressor 114, a combustion section 116, a turbine section including a high pressure (HP) turbine 118 and a low pressure (LP) turbine 120, and a jet exhaust nozzle section 122. A high pressure (HP) shaft or spool 124 drivingly connects HP turbine 118 to HP compressor 114. A low pressure (LP) shaft or spool 126 drivingly connects LP turbine 120 to LP compressor 112. The compressor section, combustion section 116, turbine section, and nozzle section 122 together define a core air flowpath 130.

In the example embodiment, fan assembly 104 includes a variable pitch fan 132 having a plurality of fan blades 134 coupled to a disk 136 in a spaced apart relationship. Fan blades 134 extend radially outwardly from disk 136 and terminate in a blade tip 137. Each fan blade 134 is rotatable relative to disk 136 about a pitch axis P by virtue of fan blades 134 being operatively coupled to a suitable pitch change mechanism (PCM) 138 configured to vary the pitch of fan blades 134. In other embodiments, PCM 138 is configured to collectively vary the pitch of fan blades 134 in unison. Fan blades 134, disk 136, and PCM 138 are together rotatable about longitudinal axis 102 by LP shaft 126 across a power gear box 140. Power gear box 140 includes a plurality of gears for adjusting the rotational speed of fan 132 relative to LP shaft 126 to a more efficient rotational fan speed.

Disk 136 is covered by a rotatable front hub 142 aerodynamically contoured to promote an airflow through the plurality of fan blades 134. Additionally, fan assembly 104 includes an annular fan casing or outer nacelle 144 that circumferentially surrounds fan 132 and/or at least a portion of core turbine engine 106. An annular containment case 145 is coupled to radially inward portions of outer nacelle 144. In the example embodiment, nacelle 144 is configured to be supported relative to core turbine engine 106 by a plurality of circumferentially-spaced outlet guide vanes 146. Moreover, a downstream section 148 of nacelle 144 may extend over an outer portion of core turbine engine 106 so as to define a bypass airflow passage 150 therebetween.

During operation of gas turbine engine 100, a volume of air 152 enters gas turbine engine 100 through an associated inlet 153 of nacelle 144 and/or fan assembly 104. As volume of air 152 passes across fan blades 134, a first portion 154 of volume of air 152 is directed or routed into bypass airflow passage 150 and a second portion 156 of volume of air 152 is directed or routed into core air flowpath 130, or more specifically into LP compressor 112. A ratio between first portion 154 and second portion 156 is commonly referred to as a bypass ratio. The pressure of second portion 156 is then increased as it is routed through high pressure (HP) compressor 114 and into combustion section 116, where it is mixed with fuel and burned to provide combustion gases 158.

Combustion gases 158 are routed through HP turbine 118 where a portion of thermal and/or kinetic energy from combustion gases 158 is extracted via sequential stages of HP turbine stator vanes 160 that are coupled to outer casing 108 and HP turbine rotor blades 162 that are coupled to HP shaft or spool 124, thus causing HP shaft or spool 124 to rotate, which then drives a rotation of HP compressor 114. Combustion gases 158 are then routed through LP turbine 120 where a second portion of thermal and kinetic energy is extracted from combustion gases 158 via sequential stages of LP turbine stator vanes 164 that are coupled to outer casing 108 and LP turbine rotor blades 166 that are coupled to LP shaft or spool 126, which drives a rotation of LP shaft or spool 126 and LP compressor 112 and/or rotation of fan 132.

Combustion gases 158 are subsequently routed through jet exhaust nozzle section 122 of core turbine engine 106 to provide propulsive thrust. Simultaneously, the pressure of first portion 154 is substantially increased as first portion 154 is routed through bypass airflow passage 150 before it is exhausted from a fan nozzle exhaust section 168 of gas turbine engine 100, also providing propulsive thrust. HP turbine 118, LP turbine 120, and jet exhaust nozzle section 122 at least partially define a hot gas path 170 for routing combustion gases 158 through core turbine engine 106.

Gas turbine engine 100 is depicted in FIG. 1 by way of example only, and in other exemplary embodiments, gas turbine engine 100 may have any other suitable configuration including for example, a turboprop engine.

Figure 2:
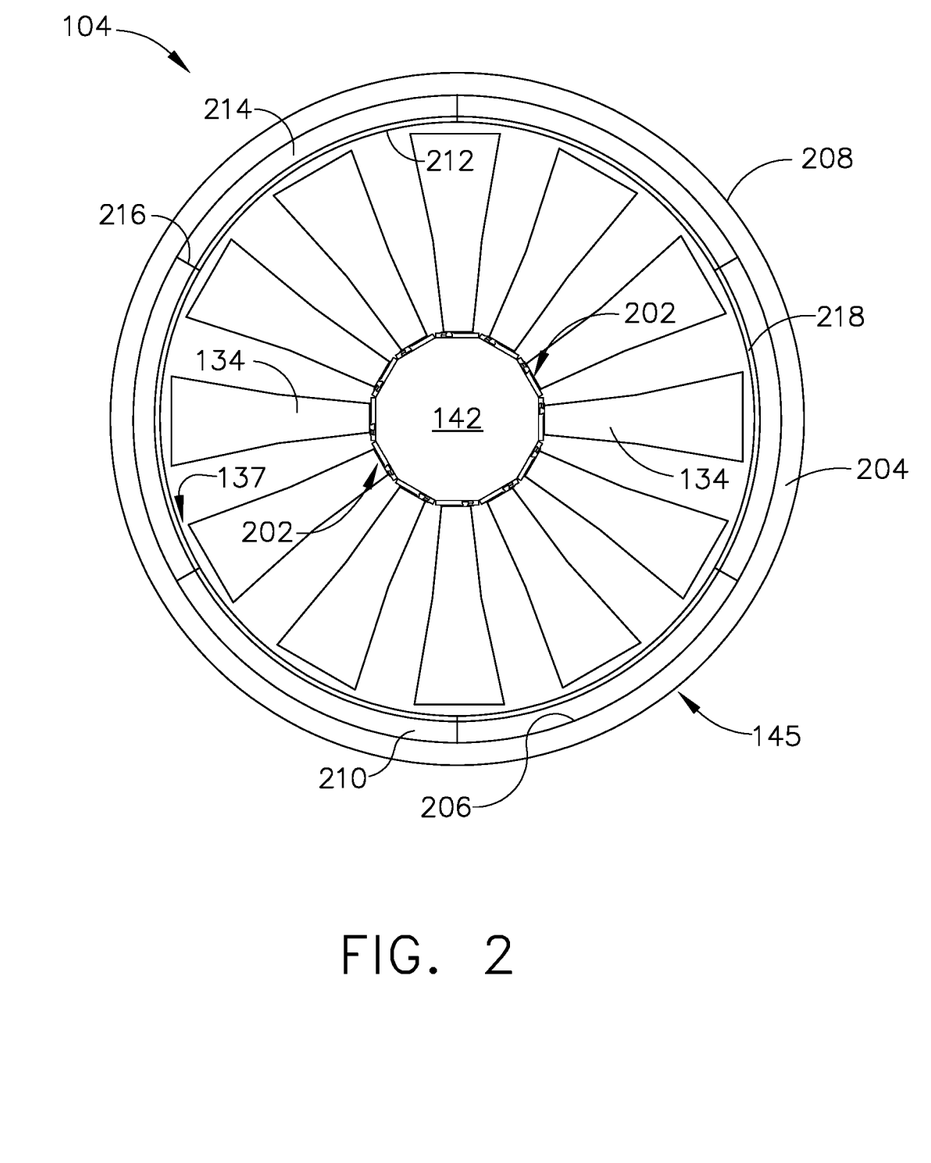
FIG. 2 is an axial view looking aft of a fan assembly that may be used in the gas turbine engine shown in FIG. 1.

FIG. 2 is an axial view looking aft of a fan assembly 104 that may be used in gas turbine engine 100 (shown in FIG. 1). In the example embodiment, fan assembly 104 includes plurality of blades 134 circumferentially spaced about fan disk 136 (not shown on FIG. 2). Each blade 134 of plurality of blades 134 extends radially outward from hub 142 between a radially inward blade root 202 and radially outward blade tip 137. Only two blades 134 are shown for clarity, however, fan assembly 104 typically includes more blades 134, for example, approximately sixteen to thirty blades 134 or more. Fan assembly 104 includes containment case 145. Containment case 145 includes a radially outer shell 204 circumscribing fan assembly 104. Outer shell 204 includes a first radially inner surface 206 and a radially outer surface 208. Containment case 145 also includes an inner structure 210. Inner structure 210 includes a second radially inner surface 212 extending along first radially inner surface 206.

Inner structure 210 includes a plurality of arcuate inner segments 214 that extend only partially around a circumference of inner structure 210. Each inner segment 214 of plurality of inner segments 214 borders an adjoining inner segment 214 at a segment boundary 216. In other embodiments, not shown, inner structure 210 is a one piece annular structure, rather than a plurality of arcuate inner segments 214. Blade tips 137 pass proximate second radially inner surface 212. Containment case 145 also includes an abradable layer 218 that extends circumferentially about inner surface 314 of containment case 145. Abradable layer 218 may include a syntactic material formed of hollow spaces within a matrix, a paper material, a friable web, or other material configured to yield to contact with blade tip 137. In still other embodiments, not shown, containment case 145 does not include abradable layer 218.

During operation of fan assembly 104, blades 134 facilitate passage and acceleration of air into aftward portions of gas turbine engine 100, as shown and described above with reference to FIG. 1. Containment case 145 provides support for fan assembly 104 and prevents undesirable projectile flight of a released blade 134 to the outside of gas turbine engine 100 including, without limitation, during a fan blade out (FBO) event. In the event a blade 134 is released from hub 142 during operation, it first impacts inner structure 210. Initial impact of released blade 134 with inner structure 210 facilitates dissipation of impact energy and prevention of contact of released blade 134 with outer shell 204. If released blade 134 does make contact with first radially inner surface 206 of outer shell 204, such contact will be of a lesser impact energy on account of released blade first impacting inner structure 210. As a result of dissipation of impact energy of released blade 134 by inner structure 210, potential damage to outer shell 204 is minimized and the threat to operators and bystanders is mitigated significantly.

Figure 3:
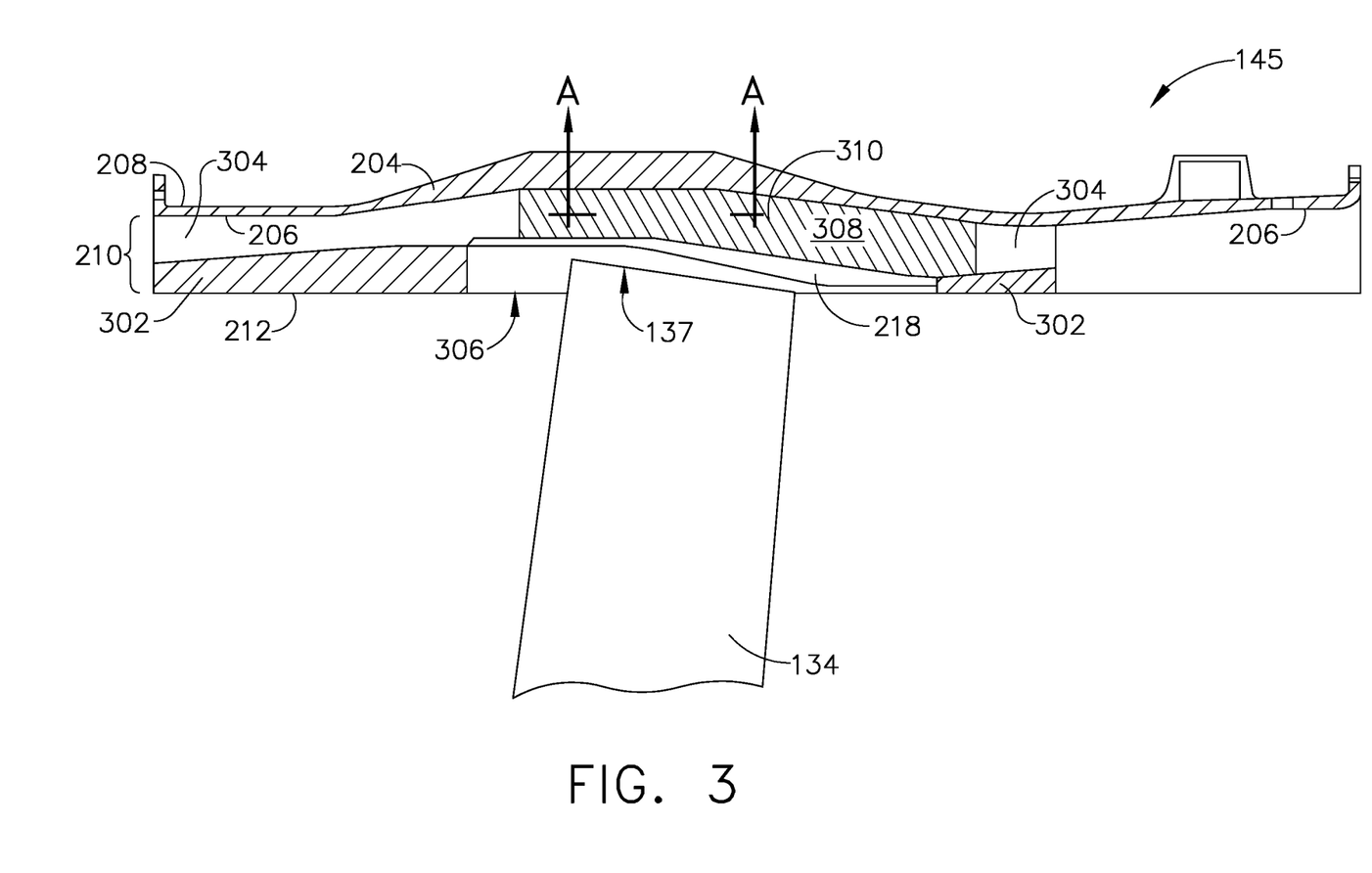
FIG. 3 is a side elevation view of a portion of the containment case that may be used in the fan assembly shown in FIG. 2.

FIG. 3 is a side elevation view of a portion of containment case 145 that may be used in fan assembly 104 (shown in FIG. 2). In the example embodiment, containment case 145 includes outer shell 204 with first radially inner surface 206. Containment case 145 also includes inner structure 210, as shown and described above with reference to FIG. 1. Inner structure 210 includes at least one material having at least one specified function in containment case 145. Inner structure 210 includes a radially inward first layer 302 including, without limitation, an acoustic dampening material. Inner structure 210 also includes a radially outward second layer 304 including, without limitation, a supportive material. Second layer 304 is coupled to first radially inner surface 206 of outer shell 204 including, without limitation, by an adhesive bond. Similarly, first layer 302 is coupled to second layer 304 including, without limitation, by an adhesive bond.

In the example embodiment, containment case 145 also includes a trench 306. Trench 306 extends circumferentially about second radially inner surface 212 into inner structure 210 from second radially inner surface 212. In the example embodiment, trench 306 extends entirely through inner structure 210 all the way to first radially inner surface 206 of outer shell 204. In other embodiments, not shown, trench 306 does not extend all the way through inner structure 210, but, rather, extends partially into inner structure 210 from second radially inner surface 212. Trench 306 is approximately axially aligned with fan assembly 104 and with blade tips 137 thereof.

In the example embodiment, containment case 145 further includes a trench filler layer 308. Trench filler layer 308 is constructed of a material including, without limitation, a fibrous composite material. Trench filler layer 308 is positioned within trench 306. Trench filler layer 308 extends circumferentially about trench 306. Trench filler layer 308 includes a plurality of arcuate segments 310 that extend only partially around circumference of inner structure 210. Each segment 310 of the plurality of segments 310 borders an adjoining segment 310 at segment boundary 216 (shown in FIG. 2). In other embodiments, not shown, trench filler layer 308 is a one piece annular structure, rather than a plurality of segments 310. In the example embodiment, trench filler layer 308 is coupled to first radially inward surface 206 of outer shell 204 including, without limitation, by way of adhesive bond. In those other embodiments in which trench 306 does not extend all the way through inner structure 210, but, rather, extends partially into inner structure 210 from second radially inner surface 212, trench filler layer 308 is coupled to inner structure 210 including, without limitation, by way of adhesive bond.

In the example embodiment, containment case 145 also includes abradable layer 218 that extends circumferentially about inner surface 314 of containment case 145, as shown and described above with reference to FIG. 1. Abradable layer 218 is also positioned within trench 306. Abradable layer 218 extends circumferentially about trench 306 on a radially inward side of trench filler layer 308. Abradable layer 218 is coupled to the radially inward side of trench filler layer 308 including, without limitation, by way of adhesive bond. In other embodiments, not shown, abradable layer 218 is not present in containment case 145. In the example embodiment, blade tips 137 extend partially into trench 306, but do not make contact with either trench filler layer 308 or abradable layer 218 (if present). Also shown in FIG. 3 is a radial section A-A of trench filler layer 308 which is referenced, shown, and described below in FIG. 4.

During operation of the example embodiment, containment case 145 provides support for fan assembly 104 and prevents undesirable projectile flight of a released blade 134 to the outside of gas turbine engine 100 including, without limitation, during an FBO event. In the event a blade 134 is released from hub 142 during operation, it first impacts inner structure 210 including, without limitation, at trench filler layer 308 or abradable layer 218 (if present). Initial impact of released blade 134 with trench filler layer 308 facilitates dissipation of impact energy and prevention of contact of released blade 134 with outer shell 204, as described above with reference to FIG. 1. Furthermore, rotatable machines other than gas turbine engine 100 share many of the operational characteristics described above with reference to FIGS. 2 and 3. Potentially releasable components from rotatable machines including, without limitation, components that are potentially releasable from rotors of rotatable machines during operation, are containable using the example embodiment shown and described with reference to FIGS. 2 and 3. In those other embodiments, not shown, potentially releasable components include components of rotatable machines other than blades 134, but the applications of the example embodiment are substantially analogous.

Figure 4:
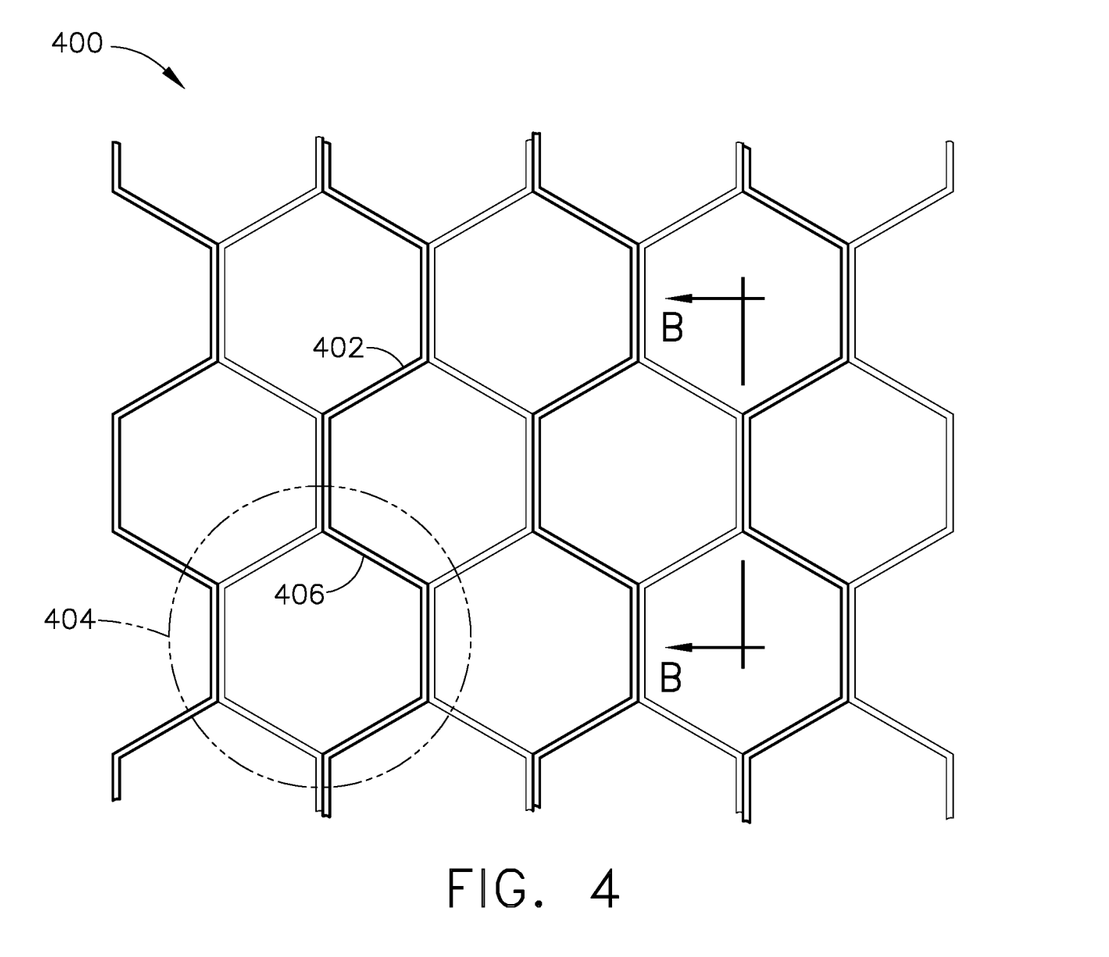
FIG. 4 is a sectional view of an example embodiment of a fibrous composite material that may be used in the trench filler layer shown in FIG. 3.

FIG. 4 is a sectional view of an example embodiment of a fibrous composite material 400 that may be used in trench filler layer 308 (shown in FIG. 3). FIG. 4 depicts radial Section A-A from FIG. 3. In the example embodiment, fibrous composite material 400 includes a plurality of sheets 402. Each sheet 402 of the plurality of sheets 402 of fibrous composite material 400 is of the same fibrous composite material 400. In the example embodiment, each sheet 402 includes at least one ply, not shown. Each ply of sheet 402 includes at least one lamina, not shown. Plies and laminae of sheet 402 are constructed of fibrous composite material 400 including, without limitation, material that has been pre-impregnated with a resin system including, without limitation, a resin system with an epoxy and a curing agent, i.e., prepreg. In other embodiments, not shown, plies and laminae of sheet 402 are constructed of fibrous composite material 400 including thermoplastic including, without limitation, material with thermoplastic carrier rather than polymeric resin as with prepreg.

In the example embodiment, sheets 402 of fibrous composite material 400 are folded in a regular pattern, including, without limitation, a regular repeating pattern of sheets 402. A single regular repeating pattern of sheets 402 includes at least one sheet 402. Sheets 402 which are so folded are coupled to adjoining sheets 402 of the plurality of sheets 402 including, without limitation, by way of adhesive bond or resin cure. Upon other fabrication steps of fibrous composite material 400 including, without limitation, additional folding and coupling of the plurality of sheets 402, further coupling of the plurality of sheets 402 yields a hollow cellular structure 404. Hollow cellular structure 404 is defined by a plurality of cell walls 406. In the example embodiment, hollow cellular structure 404 includes a repeating honeycomb pattern of interlocking hexagons. In the example embodiment, a single cell of hexagonal hollow cellular structure 404 includes six cell walls 406. In other embodiments, not shown, hollow cellular structure includes repeating patterns of, without limitation, squares and triangles. Also shown in FIG. 4 is an axial section B-B of fibrous composite material 400 which is referenced, shown, and described below in FIG. 5.

During operation of the example embodiment, fibrous composite material 400 enables tailoring at least one physical characteristic of trench filler layer 308 including, without limitation, a sheer stiffness thereof. Sheer stiffness of trench filler layer 308 can be controlled by varying at least one design parameter of fibrous composite material 400. By way of example only, and starting from a baseline axial width, W, of each hexagon of a plurality of interlocking hexagons of repeating honeycomb pattern of fibrous composite material 400, decreasing W by an amount x, i.e., W−x, increases sheer stiffness of trench filler layer 308 above a baseline sheer stiffness, k. Increasing W by x, i.e., W+x, decreases sheer stiffness of trench filler layer 308 below k.

Also, during operation of the example embodiment, and also by way of example only, starting from baseline numbers of plies, P, and laminae, L, of each sheet 402 of the plurality of sheets 402 of fibrous composite material 400, decreasing P by an amount y, i.e., P−y, and/or decreasing L by an amount z, i.e., L−z, decreases sheer stiffness of trench filler layer 308 below k. Increasing P by y, i.e., P+y, and/or increasing L by z, i.e., L+z, increases the sheer stiffness of trench filler layer 308 above k. Likewise, increasing the number of sheets 402 of regular repeating pattern of sheets 402 per cell wall 406 of hollow cellular structure 404 above a baseline number of sheets 402, S, by a number of sheets 402, a, i.e., S+a, increases sheer stiffness of trench filler layer 308 above k. Decreasing the number of sheets 402 of regular repeating pattern of sheets 402 per cell wall 406 of hollow cellular structure 404 below S by a number of sheets 402, b, i.e., S−b, decreases sheer stiffness of trench filler layer 308 below k.

Further, during operation of the example embodiment, and also by way of example only, increasing a radial thickness of trench filler layer 308 above a baseline thickness, T, by an amount c, i.e., T+c, increases sheer stiffness of trench filler layer 308 above k. Decreasing radial thickness of trench filler layer 308 above T by an amount d, i.e., T−d, decreases sheer stiffness of trench filler layer 308 below k. By varying design parameters including, without limitation, design parameters described above, of fibrous composite material 400, physical characteristics of trench filler layer 308 are tailorable to performance requirements of containment case 145. Depending on performance requirements including, without limitation, of gas turbine engines and other rotatable machines, trench filler layer 308 is fabricated with design parameters to meet the performance requirements. By way of example only, in the example embodiment, thickness of trench filler layer 308 is varied to accommodate varying radial dimensions of blades 134 of gas turbine engine 100.

Figure 5:
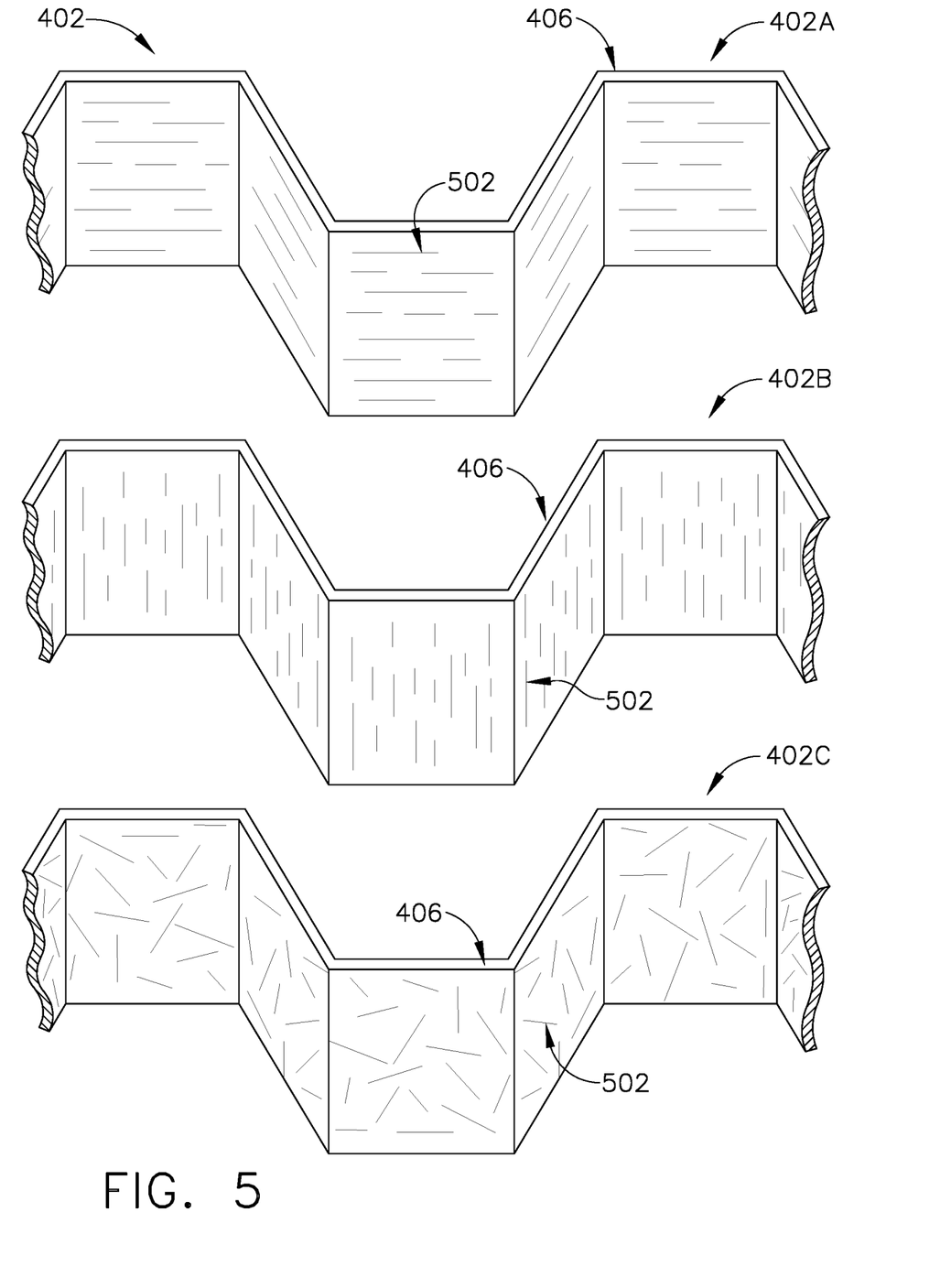
FIG. 5 is a sectional view of a regular repeating pattern of sheets that may be used in the fibrous composite material shown in FIG. 4.

FIG. 5 is a sectional view of a regular repeating pattern of sheets 402 that may be used in fibrous composite material 400 (shown in FIG. 4). FIG. 5 depicts axial Section B-B from FIG. 4. In the example embodiment, sheets 402 are folded into regular repeating patterns including a plurality of cell walls 406. Sheets 402 include a plurality of fibers 502. Fibers 502 are oriented within sheets 402 in a number of ways. Orientation of fibers 502 within sheets 402 include, without limitation, longitudinal, transverse, and diagonal orientations, including, without limitation, a diagonal orientation at randomly distributed angles.

In the example embodiment, sheet 402A includes fibers 502 oriented longitudinally. Sheet 402B includes fibers 502 oriented transversely. Sheet 402C includes fibers 502 oriented diagonally at randomly distributed angles. In each sheet of sheets 402A-402C, materials of construction of fibers 502 include, without limitation, carbon fibers and glass fibers. Presence of fibers 502 in sheets 402 reinforce sheets 402. Depending on particular design requirements of the application in containment case 145 (not shown in FIG. 5), fibers 502 include various lengths and cross-sectional diameters. Lengths of fibers 502 range from nominal lengths up to lengths that approach a length of sheets 402. Diameters of fibers 502 range from nominal diameters up to diameters that approach a thickness of sheets 402. In the example embodiment, fibers 502 within sheets 402 have various lengths and/or diameters. In other embodiments, not shown, fibers 502 within sheets 402 have substantially equal lengths and diameters.

During operation of the example embodiment, fibers 502 of sheets 402 further enables adjusting at least one physical characteristic of trench filler layer 308 including, without limitation, its sheer stiffness. Sheer stiffness of trench filler layer 308 can be controlled by varying dimensions and materials of construction of fibers 502 including, without limitation, during fabrication of fibrous composite material 400. By way of example only, longer fibers 502 impart greater sheer stiffness to sheets 402 than do short fibers 402. Also, a density of fibers 502, i.e., a number of fibers 502 per unit area and/or per unit volume of sheets 402, is variable during fabrication of trench filler layer 308 and further enables adjusting physical characteristics of trench filler layer 308, such as sheer stiffness.

Additionally, in operation of the example embodiment, an in-plane coefficient of thermal expansion (CTE) of trench filler layer 308 is also selectable during fabrication. Such properties or characteristics are selected based on a length of fibers 502, placement of fibers 502 with respect to each other, placement of fibers 502 with respect to an orientation of containment case 145, meaning whether fibers 502 are oriented axially, circumferentially, or diagonally. A number of fibers 502 placed in each orientation also at least partially determines the in-plane mechanical and physical properties and in-plane CTE of trench filler layer 308.

Figure 6:
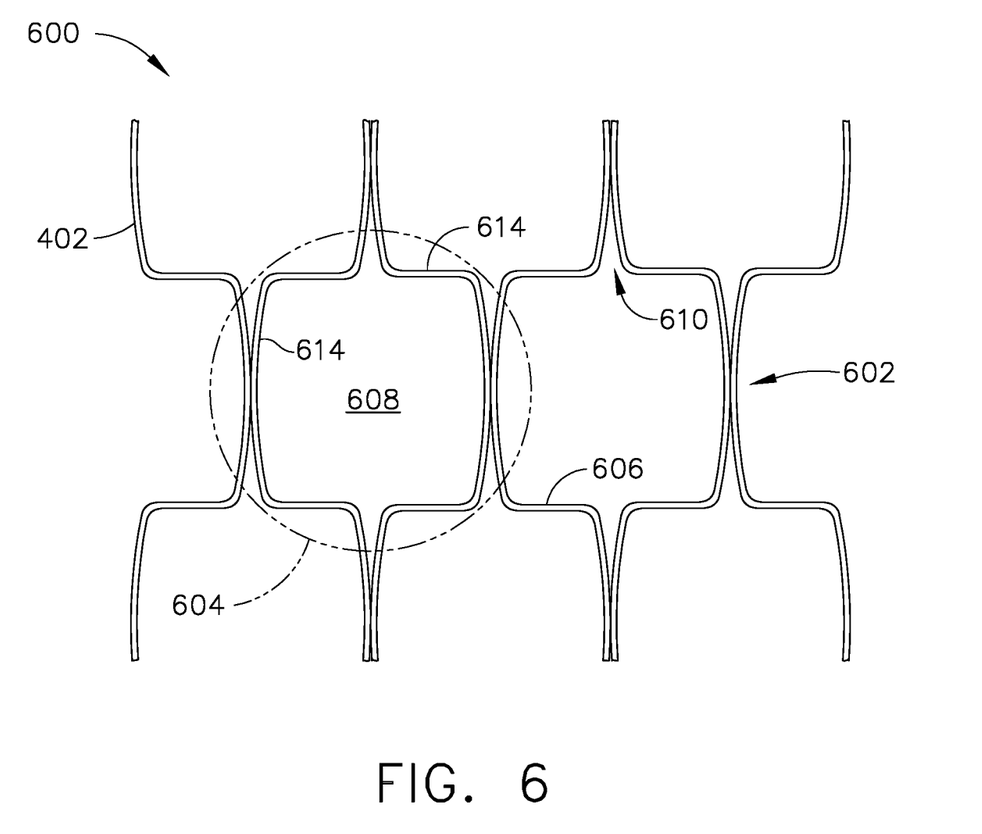
FIG. 6 is a sectional view of an alternative embodiment of a fibrous composite material that may be used in the trench filler layer shown in FIG. 3.

FIG. 6 is a sectional view of an alternative embodiment of a fibrous composite material 600 that may be used in trench filler layer 308 (shown in FIG. 3). FIG. 6 depicts an alternative embodiment of radial Section A-A from FIG. 3. In the alternative embodiment, fibrous composite material 600 includes a plurality of sheets 402. Each sheet 402 of plurality of sheets 402 of fibrous composite material 600 is of the same fibrous composite material 600 including, without limitation, of the same material as fibrous composite material 400, as shown and described above with reference to FIG. 4.

In the alternative embodiment, sheets 402 of fibrous composite material 600 are folded and bent in a regular pattern, including, without limitation, a regular repeating pattern of sheets 402. A single regular repeating pattern of sheets 402 includes at least one sheet 402. Sheets 402 which are so folded and bent are coupled to adjoining sheets 402 of the plurality of sheets 402 including, without limitation, by way of adhesive bond, at bonding points 602.

Upon other fabrication steps of fibrous composite material 600 including, without limitation, additional folding, bending, and coupling of the plurality of sheets 402, further coupling of the plurality of sheets 402 yields a hollow cellular structure 604. Hollow cellular structure 604 is defined by a plurality of cell walls 606. In the example embodiment, hollow cellular structure 604 includes a repeating honeycomb pattern of approximately rectangular units 608 having approximately conical notches 610 on parallel sides thereof. A single rectangular unit 608 of hollow cellular structure 604 includes four cell walls 606. In the alternative embodiment, each rectangular unit 608 includes two parallel bent sides 612 and two parallel notched sides 614.

During operation of the example embodiment, fibrous composite material 600 enables tailoring at least one physical characteristic of trench filler layer 308 including, without limitation, a sheer stiffness thereof. Sheer stiffness of trench filler layer 308 can be controlled by varying at least one design parameter of fibrous composite material 600, including as shown and described above in FIG. 4 with reference to fibrous composite material 400. In addition to design parameters described above with reference to FIG. 4, and by way of example only, varying a radius of an arc defined by parallel bent sides 612 varies the sheer stiffness of trench filler layer 308. As arc radius of parallel bent sides 612 increases, notches 610 become narrower, and sheer stiffness of trench filler layer 308 increases. As arc radius of parallel bent sides 612 decreases, notches 610 become broader, and sheer stiffness of trench filler layer 308 decreases. Likewise, varying the sizes of rectangular units 608 of fibrous composite material 600 varies sheer stiffness of trench filler layer 308. In the alternative embodiment, smaller rectangular units 608 result in trench filler layer 308 having higher sheer stiffness than larger rectangular units 608.

The above-described embodiments of the containment case trench filler layer apparatus and methods described herein mitigate the threat to operators and bystanders from released components of rotatable machines such as gas turbine engines. The containment case trench filler layer apparatus and methods described above also mitigate damage to, and repair extensiveness for, rotatable machines such as gas turbine engines resulting from released components thereof. Further, the containment case trench filler layer apparatus and methods described above mitigate negative effects of released components on the operational performance of rotatable machines such as gas turbine engines. Furthermore, the containment case trench filler layer apparatus and methods described above provide effective energy dissipation upon impact of released components in rotatable machines such as gas turbine engines. Moreover, the containment case trench filler layer apparatus and methods described above enable tailoring physical characteristics such as sheer stiffness to particular operational requirements of rotatable machines such as gas turbine engines without increasing weight and space of trench filler layers.

Exemplary containment case trench filler layer apparatus, systems, and methods are described above in detail. The apparatus illustrated is not limited to the specific embodiments described herein, but rather, components of each may be utilized independently and separately from other components described herein. Each system component can also be used in combination with other system components.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A containment case for a fan assembly, the fan assembly including a hub having a plurality of fan blades extending radially outward between radially inward blade roots and radially outward blade tips, said containment case comprising:
    a radially outer shell circumscribing the fan assembly and including a first radially inner surface and a radially outer surface;
    an inner structure including a radially inward first layer, a radially outward second layer, and a second radially inner surface extending along said first radially inner surface;
    a trench extending circumferentially along said second radially inner surface and into said inner structure from said second radially inner surface, said trench approximately axially aligned with the fan assembly, wherein each of the radially inward first layer and the radially outward second layer extends axially both forward and aft of the trench; and
    a trench filler layer within said trench, said trench filler layer configured to dissipate an amount of impact energy from a released fan blade and comprising a plurality of sheets, each sheet of said plurality of sheets comprising a fibrous composite material having a plurality of fibers fabricated within each sheet of said plurality of sheets, wherein said plurality of sheets are coupled together into a repeating pattern of hollow units defined by cell walls, and wherein each cell wall includes a sheet of the plurality of sheets comprising the fibrous composite material.

2. The containment case in accordance with claim 1, wherein said trench extends completely into said inner structure to said first radially inner surface.

3. The containment case in accordance with claim 1, wherein said trench filler layer further comprises a plurality of separable, arcuate segments, each segment of said plurality of segments extending circumferentially about a portion of said trench by a predetermined arcuate distance, wherein each segment of the plurality of segments borders and is connected to an adjourning segment of the plurality of segments at a segment boundary.

4. The containment case in accordance with claim 1, wherein the blade tips extend partially into said trench.

5. The containment case in accordance with claim 1, wherein:
    said fibrous composite material comprises at least one of prepreg and thermoplastic; and
    said repeating pattern of hollow units comprises at least one of:
        a repeating pattern of interlocking hexagons; and
        a repeating pattern of approximately rectangular units.

6. The containment case in accordance with claim 1, wherein said plurality of fibers are arranged in at least one of the following orientations with respect to said each sheet:
    longitudinal;
    transverse;
    diagonal with approximately equivalent orientation angles with respect to each other fiber of said plurality of fibers within said each sheet of said plurality of sheets; and
    diagonal with randomly distributed orientation angles with respect to each other fiber of said plurality of fibers within said each sheet of said plurality of sheets.

7. The containment case in accordance with claim 1, wherein said plurality of fibers comprises fibers having approximately equal physical characteristics including at least one of:
    a diameter;
    a length;
    a material of construction;
    an orientation; and
    a density.

8. The containment case in accordance with claim 1, wherein said plurality of fibers comprises fibers having dissimilar physical characteristics, the physical characteristics including at least one of:
    a diameter;
    a length;
    a material of construction;
    an orientation; and
    a density.

9. A gas turbine engine comprising:
    a fan assembly comprising a hub including a plurality of fan blades extending radially outward between radially inward blade roots and radially outward blade tips; and
    a containment case comprising:
        a radially outer shell circumscribing said fan assembly and including a first radially inner surface and a radially outer surface;
        an inner structure including a radially inward first layer, a radially outward second layer, and a second radially inner surface extending along said first radially inner surface;
        a trench extending circumferentially along said second radially inner surface and into said inner structure from said second radially inner surface, said trench approximately axially aligned with said fan assembly, wherein each of the radially inward first layer and the radially outward second layer extends axially both forward and aft of the trench; and
        a trench filler layer within said trench, said trench filler layer configured to dissipate an amount of impact energy from a released fan blade and comprising a plurality of sheets, each sheet of said plurality of sheets comprising a fibrous composite material having a plurality of fibers fabricated within each sheet of said plurality of sheets, wherein said plurality of sheets are coupled together into a repeating pattern of hollow units defined by cell walls, and wherein each cell wall includes a sheet of the plurality of sheets comprising the fibrous composite material.

10. The gas turbine engine in accordance with claim 9, wherein said trench extends completely into said inner structure to said first radially inner surface.

11. The gas turbine engine in accordance with claim 9, wherein said trench filler layer further comprises a plurality of separable, arcuate segments, each segment of said plurality of segments extending circumferentially about a portion of said trench by a predetermined arcuate distance, wherein each segment of the plurality of segments borders and is connected to an adjourning segment of the plurality of segments at a segment boundary.

12. The gas turbine engine in accordance with claim 9, wherein said blade tips extend partially into said trench.

13. The gas turbine engine in accordance with claim 9, wherein:
    said fibrous composite material comprises at least one of prepreg and thermoplastic; and
    said repeating pattern of hollow units comprises at least one of:
        a repeating pattern of interlocking hexagons; and
        a repeating pattern of approximately rectangular units.

14. The gas turbine engine in accordance with claim 9, wherein said plurality of fibers are arranged in at least one of the following orientations with respect to said each sheet:
    longitudinal;
    transverse;
    diagonal with approximately equivalent orientation angles with respect to each other fiber of said plurality of fibers within said each sheet of said plurality of sheets; and
    diagonal with randomly distributed orientation angles with respect to each other fiber of said plurality of fibers within said each sheet of said plurality of sheets.

15. The gas turbine engine in accordance with claim 9, wherein said plurality of fibers comprises fibers having approximately equal physical characteristics including at least one of:
    a diameter;
    a length;
    a material of construction;
    an orientation; and
    a density.

16. The gas turbine engine in accordance with claim 9, wherein said plurality of fibers comprises fibers having dissimilar physical characteristics, the physical characteristics including at least one of:
    a diameter;
    a length;
    a material of construction;
    an orientation; and
    a density.

\* \* \* \* \*